Oct. 15, 1946.   E. J. CANNON ET AL   2,409,250
SEPARATION OF BUTADIENE
Filed Nov. 7, 1944
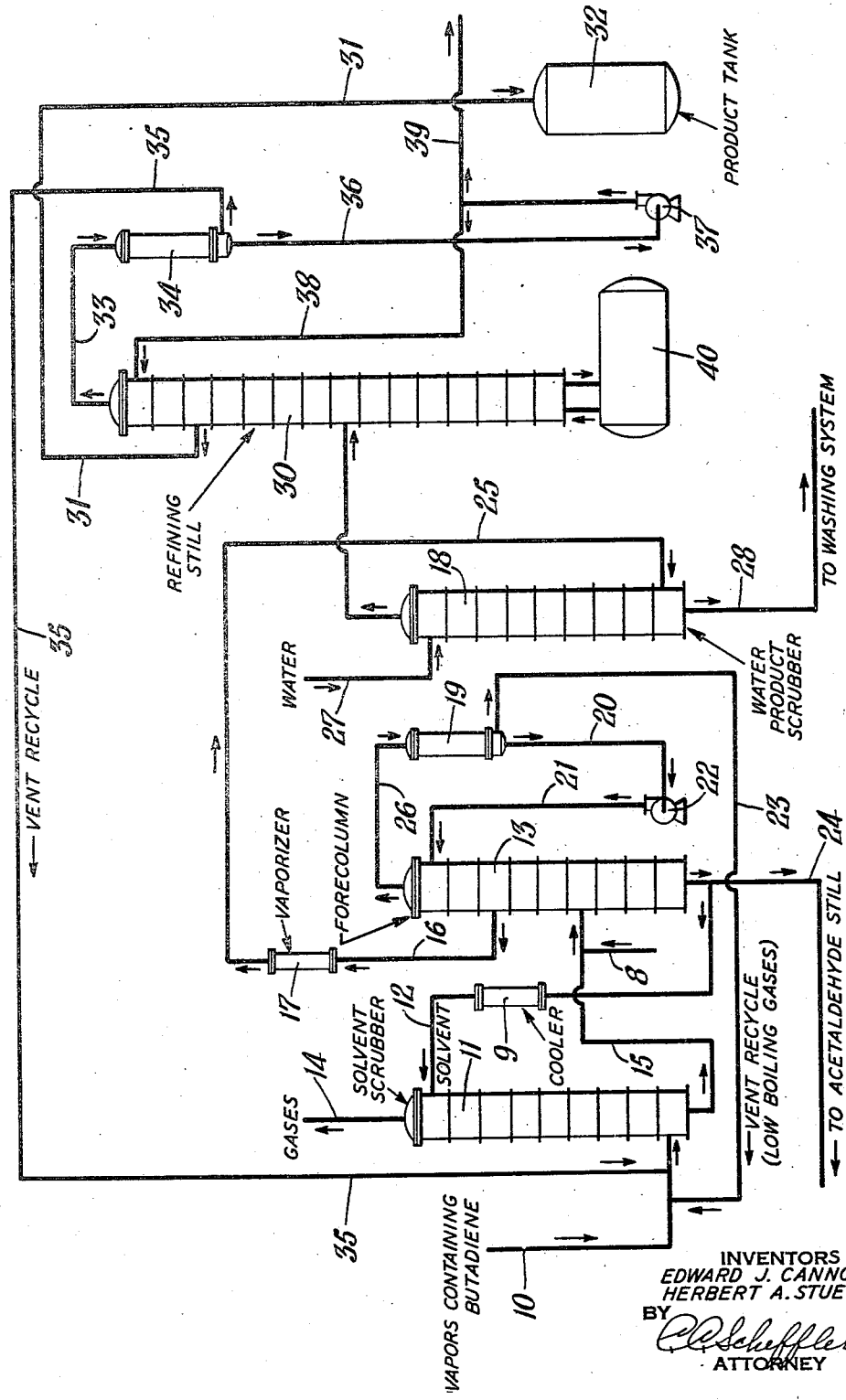
INVENTORS
EDWARD J. CANNON
HERBERT A. STUEWE
BY
   *C. A. Scheffler*
   ATTORNEY Patented Oct. 15, 1946

2,409,250

UNITED STATES PATENT OFFICE 2,409,250

SEPARATION OF BUTADIENE

Edward J. Cannon, Dunbar, and Herbert A. Stuewe, South Charleston, W. Va., assignors to Carbide and Carbon Chemicals Corporation, a corporation of New York Application November 7, 1944, Serial No. 562,344

6 Claims. (Cl. 260—681.5)

This invention relates to a process for separating butadiene from other volatile hydrocarbons. The method may be operated in cooperation with methods for removing water-soluble organic compounds from the butadiene as well.

The invention is particularly adapted for separating and purifying butadiene produced by passing a mixture of acetaldehyde and ethanol over appropriate catalysts. Side-reactions occur in such processes, whereby considerable amounts of hydrocarbons containing less than four carbon atoms are formed, such as methane, ethylene and propylene. Small amounts of hydrocarbons having four carbon atoms, other than butadiene, such as butene-1 and butene-2, are also found in the reaction products.

According to this invention, butadiene is separated from more volatile gases by scrubbing the gas mixture with a solvent under selected temperatures, pressures, and solvent-gas ratios whereby substantially complete dissolution of the butadiene in the solvent is obtained. By this means, appreciable loss of butadiene in the "blow-off" gases is avoided, but small amounts of the more volatile hydrocarbons are also dissolved in the solvent. The butenes also dissolve in the solvent. In general, the conditions of the scrubbing operation are adjusted so that the "blow-off" gases contain less than 2% butadiene by volume. Ethanol is the preferred solvent, and, in commercial practice, the ethanol solvent may contain water and organic liquids, such as acetaldehyde, ethyl acetate, acetic acid and other organic materials, as are present when ethanol recovered from the dehydrogenation of ethanol to acetaldehyde is employed as the scrubbing liquid. However, other solvents having a boiling point higher than butadiene, such as pentane, hexane, cyclohexane, kerosene and turpentine may be employed.

The volatile gases which are dissolved in the solvent, when scrubbing the gas mixtures, introduce additional complications in the purification of butadiene, since they must eventually be discharged from the system. For instance, in the separation of butadiene from butenes according to the process described in Young and Perkins Patent No. 1,948,777, the volatile gases carry with them a small amount of butadiene in leaving the absorber, which causes a loss of valuable product.

A method has now been discovered whereby butadiene may be recovered practically quantitatively from more volatile hydrocarbons by dissolving the butadiene in a solvent, and distilling the solution thus formed to remove a butadiene fraction largely freed of more volatile hydrocarbons. This is accomplished by removing a butadiene fraction at a point in the column above the feed point and below the top of the column. The overhead vapors from the column are partially condensed, the condensate returned as reflux to the column and the uncondensed vapors recycled through the scrubber to discharge the volatile gases and to recover the butadiene.

When the butadiene solution distilled contains acetaldehyde, the aldehyde appears in the butadiene fraction, since acetaldehyde and butadiene form a mixture of constant boiling point. The acetaldehyde is readily separated from the butadiene fraction by scrubbing the fraction in the vapor phase with water.

The butadiene fraction, after removal of the acetaldehyde, contains much of the butenes present in the original mixture, but only negligible amounts of hydrocarbons having less than four carbon atoms. The butenes may be removed by known methods, but the fact that the more volatile hydrocarbons have been removed from the butadiene fraction enables a separation to be effected by an improved method. The butenes comprise butene-1, trans-butene-2 and cis-butene-2 which have boiling points of $-6.27°$ C., $+0.91°$ C. and $+3.65°$ C., respectively at 760 mm. The mixture containing butadiene is fractionally distilled, and a butadiene product of high purity is removed at a point below the top of the column. The overhead vapor containing butadiene, butene-1, trans-butene-2 and a minute amount of more volatile hydrocarbons are condensed and most of the condensate returned as reflux to the still. Unless the volatile gases were removed from the butadiene fraction prior to the refining step, it would be difficult to separate a butadiene product of high purity.

A more detailed description of the invention with reference to the attached flow sheet follows:

Vapors containing butadiene are introduced through lines 10 to a scrubber 11. When the butadiene has been formed by the reaction of acetaldehyde and ethanol, such vapors comprise the uncondensed portion of the reaction products and they may contain by volume 63.0% butadiene, 3.5% other four carbon atom hydrocarbons, mostly butenes, 6.5% three carbon atom hydrocarbons, mostly propylene, 14.6% two carbon atom hydrocarbons, mostly ethylene, 1.7% methane, 8.0% acetaldehyde and 2.7% diethyl ether. A suitable solvent is introduced to the top of the scrubber through line 12. As shown, this solvent may be part of the residue discharged from the butadiene forecolumn 13. Before using the residue for this purpose, it is passed through cooler 9. This residue may contain by weight 58.0% ethanol, 18.0% water, 15.0% acetaldehyde, 4.0% diethyl ether, 1% ethyl acetate and 4.0% miscellaneous by-products. A condensate resulting from liquefying part of the material obtained when ethanol is dehydrogenated to acetaldehyde may also be employed as the solvent. This condensate may contain by weight 60.0% ethanol, 23.0% acetaldehyde, 10.0% water, 3.0% acetic acid, 2.0% ethyl acetate and 2.0% miscellaneous by-products. In general, a pressure of about 55 pounds per square inch (p. s. i.) is maintained on the scrubber to assist in dissolving the butadiene, while the bottom of the scrubber is operated at about 50° to 55° C. so that a minimum of the more volatile hydrocarbons will be dissolved in the solvent. Under the conditions specified, the ratio of vapors scrubbed to solvent is about 3.5 cubic feet of vapor per gallon of solvent, although this ratio will depend on the butadiene content of the vapors; and will be affected by the solvent power and volatility of the solvent. The scrubbing conditions, however, should be correlated so that the "blow-off" gases leaving the top of the scrubber through pipe 14 contain less than 2% butadiene by volume. In a typical example, these gases contain approximately by volume 12.0% methane, carbon dioxide and other gases having one carbon atom, 70.0% two carbon atom hydrocarbons, 17.0% three carbon atom hydrocarbons and 0.2% butadiene.

The butadiene solution passes from the scrubber 11 to the forecolumn 13 through pipe 15. The purpose of this column is to separate butadiene and butenes, largely denuded of more volatile hydrocarbons, from ethanol, acetaldehyde and other higher boiling material.

A condensate from the reaction producing butadiene may also be introduced to the column through line 8. The column is operated so that the hydrocarbons which are more volatile than butadiene concentrate at the head of the column, and a constant boiling mixture of butadiene and acetaldehyde largely freed of more volatile gases, accumulates at a point two to eight trays below the top of the column, which may contain 55 trays. This mixture may contain by volume 90.0% butadiene, 7.3% acetaldehyde, 2.5% four carbon atom hydrocarbons other than butadiene, and only 0.2% hydrocarbons having three carbon atoms or less, when the column is operated under a pressure of 65 to 70 p. s. i., and with a head and base temperature of 48° and 115° C. respectively. This mixture is withdrawn from the column either in the liquid or vapor phase, but it is more effectively withdrawn in the liquid phase. The liquid is withdrawn through pipe 16 to vaporizer 17, and the vapors pass to scrubber 18 through pipe 25.

The overhead vapor from the butadiene forecolumn passes to a condenser 19 through pipe 26. This vapor contains about 88.0% butadiene, 6.3% acetaldehyde, 2.4% four carbon atom hydrocarbons other than butadiene and 3.3% hydrocarbons having three carbon atoms or less. Thus, it is apparent that a sharp separation of the more volatile hydrocarbons has been effected. The condensate from the condenser is pumped through pipes 20 and 21 by pump 22 to the forecolumn 13 as reflux. A reflux ratio of about 5 to 1 is maintained on the column. To maintain the necessary butadiene content of this reflux, and to assure that the butadiene may be continuously separated from the more volatile hydrocarbons, it is necessary that the uncondensed gases be vented from the condenser, and the butadiene contained in them recovered. These vent gases contain by volume approximately 79.5% butadiene, 0.7% acetaldehyde, 1.0% four carbon atom hydrocarbons other than butadiene and 18.8% gases having three carbon atoms or less. The vent gases are recycled through pipe 23 to the scrubber 11 to recover the butadiene present. The volatile gases dissolved in the solvent are thus returned and ultimately discharged from the scrubber.

The residue from the butadiene forecolumn passes through pipe 24 to a distillation system to recover its valuable constituents, acetaldehyde being the most volatile constituent present in appreciable quantities. As previously noted, part of this residue may be employed as the solvent in the scrubber 11, being returned through pipe 12.

The purpose of the scrubber 18 is to remove the acetaldehyde from the constant boiling mixture of butadiene and acetaldehyde removed from the butadiene forecolumn 13. To accomplish this, water is introduced at the top of the scrubber through pipe 27 in the ratio of one gallon of water for every 22 to 30 cubic feet of vapor. This operation is carried out at a pressure of 30 p. s. i. The temperature at the base of the scrubber is held at about 42° C. to prevent condensation and loss of butadiene. The scrubbing liquid is discharged through pipe 28 and may be used for washing purposes elsewhere in the system as its acetaldehyde content is not high. Ultimately, however, the acetaldehyde is recovered. The butadiene vapor from the top of the scrubber 18 contains only minor amounts of impurities and its analysis by volume is approximately 97.1% butadiene, 2.7% four carbon atom hydrocarbons other than butadiene, and 0.2% hydrocarbons having three carbon atoms or less.

Because the low boiling gases have been substantially removed, it is possible to increase the purity of the butadiene by an improved method of fractional distillation. Butadiene boils at —4.6° C. at 760 mm., butene-1 boils at —6.27° C. at 760 mm., trans-butene-2 has a boiling point of +0.91° C. while cis-butene-2 has a boiling point of +3.65° C. so that the separation problems are complex. Heretofore, it has been necessary to employ a selective solvent, such as dichlorethyl ether, to separate butadiene from butenes. According to our improved method, the butadiene vapors to be purified are introduced to a refining still 30, which may have 81 trays. A butadiene product containing 98.7% butadiene or higher is removed as a liquid from about the eighth tray from the top of the column through pipe 31 to product tank 32. Because most of the gases containing three carbon atoms or less have been removed previously, butene-1 and trans-butene-2, as well as the residual amounts of the lighter gases, concentrate in the upper part of the column; and it is possible to effect sufficient separation of butadiene from butenes by this method to produce specification grade butadiene for polymerization to synthetic rubber.

The overhead vapor from the refining still has the approximate composition by volume of 95.0% butadiene, 2.5% butene-1, 1.7% trans-butene-2, 0.7% hydrocarbons having three carbon atoms, and a trace up to 0.1% of hydrocarbons having two carbon atoms. This overhead vapor passes through pipe 33 to condenser 34. Most of the condensate passes through pipes 36 and 38 by means of pump 37 to the refining still as reflux, but a small "heads fraction" may be removed through pipe 39 to be worked up, as by treatment with a selective solvent to recover butadiene. The material which accumulates in the kettle 40 containing cis-butene-2 and butadiene, is also removed from time to time. This material may be worked up to recover the butadiene or otherwise disposed of since it contains about 80% of valuable butenes. However, the amounts of material to be handled by such methods is much less than accumulates in the product tank 32. The vent gases from the condenser 34 are recycled through pipe 35 to the scrubber 11.

It is apparent that the invention is not limited to the exact conditions specifically described, but is to be interpreted as defined in the appended claims.

We claim:

1. Process for isolating a butadiene fraction from a gas mixture containing butadiene and hydrocarbons of greater volatility than butadiene, which comprises scrubbing such mixture with a solvent to obtain a solution containing butadiene and some of the more volatile hydrocarbons, and a scrubbed gas substantially free of butadiene, distilling the solution and removing a butadiene fraction at a point below the head of the column and above the feed point, condensing part of the vapors from the top of the column and returning the condensate as reflux to the column, and returning the uncondensed vapors to the scrubbing operation.

2. Process for isolating a butadiene fraction from a gas mixture containing butadiene and hydrocarbons of greater volatility than butadiene, which comprises scrubbing such mixture with a solvent comprising ethanol to obtain a solution containing butadiene and some of the more volatile hydrocarbons, and a scrubbed gas containing less than 2% by volume of butadiene, distilling the solution and removing a liquid butadiene fraction at a point below the head of the column and above the feed point, condensing part of the vapors from the top of the column and returning the condensate as reflux to the column, and returning the uncondensed portion of the vapors to the scrubbing operation.

3. Process for isolating a butadiene fraction from a gas mixture containing butadiene and hydrocarbons of greater volatility than butadiene, which comprises scrubbing such mixture with a solvent to obtain a solution containing butadiene and some of the more volatile hydrocarbons, and a scrubbed gas substantially free of butadiene, distilling the solution and removing a butadiene fraction at a point below the head of the column and above the feed point, condensing part of the vapors from the top of the column and returning the condensate as reflux to the column, returning the uncondensed vapors to the scrubbing operation, and reusing at least part of the solvent, after expulsion of the butadiene, for scrubbing the gas mixture.

4. Process for isolating a butadiene fraction from a gas mixture containing butadiene, acetaldehyde and hydrocarbons of greater volatility than butadiene, which comprises scrubbing such mixture with a solvent to obtain a solution containing butadiene, acetaldehyde, and some of the more volatile hydrocarbons, and a scrubbed gas substantially free of butadiene, distilling the solution and removing a constant boiling mixture of butadiene and acetaldehyde at a point below the head of the column and above the feed point, condensing part of the vapors from the top of the column and returning the condensate as reflux to the column, returning the uncondensed portion of the vapors to the first scrubbing operation, and scrubbing the constant boiling mixture of butadiene and acetaldehyde with water to obtain a butadiene fraction and an aqueous solution of acetaldehyde.

5. Process for isolating a butadiene product from a gas mixture containing butadiene, acetaldehyde, butenes and hydrocarbons of greater volatility than butadiene and butenes, which comprises scrubbing such mixture with a solvent to obtain a solution containing butadiene, acetaldehyde, and some of the more volatile hydrocarbons, and a scrubbed gas substantially free of butadiene, distilling the solution and removing a constant boiling mixture of butadiene and acetaldehyde at a point below the head of the column and above the feed point, condensing part of the vapors from the top of the column and returning the condensate as reflux to the column, returning the uncondensed portion of the vapors to the first scrubbing operation, and scrubbing the constant boiling mixture of butadiene and acetaldehyde with water to obtain a butadiene fraction containing butenes but substantially free of hydrocarbons having up to three carbon atoms, and an aqueous solution of acetaldehyde, and distilling said butadiene fraction in a refining still to remove a butadiene product at a point below the head of the still.

6. Process for isolating a butadiene product from a gas mixture containing butadiene, acetaldehyde, butenes and hydrocarbons of greater volatility than butadiene and butenes, which comprises scrubbing such mixture with a solvent to obtain a solution containing butadiene, acetaldehyde, and some of the more volatile hydrocarbons, and a scrubbed gas substantially free of butadiene, distilling the solution and removing a constant boiling mixture of butadiene and acetaldehyde at a point below the head of the column and above the feed point, condensing part of the vapors from the top of the column and returning the condensate as reflux to the column, returning the uncondensed portion of the vapors to the first scrubbing operation, and scrubbing the constant boiling mixture of butadiene and acetaldehyde with water to obtain a butadiene fraction containing butenes but substantially free of hydrocarbons having up to three carbon atoms, and an aqueous solution of acetaldehyde, distilling said butadiene fraction in a refining still to remove a liquid butadiene product at a point below the head of the still, condensing part of the distillate and returning the uncondensed portion to the first scrubbing operation.

EDWARD J. CANNON.
HERBERT A. STUEWE.